United States Patent [19]

Yokoyama

[11] Patent Number: 4,602,345

[45] Date of Patent: Jul. 22, 1986

[54] METHOD AND SYSTEM FOR CONTROLLING INDUSTRIAL ROBOT

[75] Inventor: Shigeyoshi Yokoyama, Narashino, Japan

[73] Assignee: Hitachi, Ltd., Tokyo, Japan

[21] Appl. No.: 563,517

[22] Filed: Dec. 20, 1983

[30] Foreign Application Priority Data

Dec. 22, 1982 [JP] Japan .................................. 57-223756

[51] Int. Cl.$^4$ ......................... G06F 15/46; G05B 19/42
[52] U.S. Cl. ..................................... 364/513; 364/191; 901/2; 901/3
[58] Field of Search ............... 364/513, 474, 475, 478, 364/191, 192, 193; 318/568; 414/730, 744; 901/2-5, 7

[56] References Cited

U.S. PATENT DOCUMENTS

| | | | |
|---|---|---|---|
| 3,909,600 | 9/1975 | Hohn | 364/513 |
| 4,086,522 | 4/1978 | Engelberger et al. | 364/513 X |
| 4,140,953 | 2/1979 | Dunne | 364/513 X |
| 4,338,672 | 7/1982 | Perzley et al. | 364/513 |
| 4,348,731 | 9/1982 | Kogawa | 364/513 |
| 4,433,382 | 2/1984 | Cunningham et al. | 364/513 X |
| 4,484,294 | 11/1984 | Noss | 364/513 |
| 4,486,843 | 12/1984 | Spongh et al. | 364/513 |
| 4,495,588 | 1/1985 | Nio et al. | 364/513 |
| 4,541,060 | 9/1985 | Kogawa | 364/513 |

*Primary Examiner*—Joseph Ruggiero
*Attorney, Agent, or Firm*—Beall Law Offices

[57] ABSTRACT

A control system and method for an industrial robot, wherein one of a plurality of command transforming programs is selected automatically depending on the number of transformed reference points (Pcn) which have been instructed, and the selected program transforms model commands into executable commands by which the robot is operated. Each transformed reference point corresponds to a model reference point (Ptn) and the model reference points are in a unique positional relation with the model commands.

14 Claims, 9 Drawing Figures

METHOD AND SYSTEM FOR CONTROLLING INDUSTRIAL ROBOT

TECHNICAL FIELD

The present invention relates to a method and system for controlling an industrial robot wherein model commands which have been given for defining the movement of the robot are transformed into executable commands and the operation of the robot is controlled in accordance with the executable commands.

BACKGROUND ART

If the task of a robot is basically common to a task performed by model commands with which the robot has already been instructed, it will be convenient for the operation to transform the already instructed model commands into executable commands and then operate the robot in accordance with the executable commands, instead of re-instructing the robot from the beginning; consequently, time needed to instruct the robot can be saved. In an extensive application of model commands, it will be advantageous if a plurality of command transforming programs are prepared so that one of the programs which meets the requirement of the operation is selected to generate executable commands. In this case, however, it becomes necessary to provide a switch or keys on the robot control panel so as to select a command transforming program. The robot control panel, in general, already has many switches and keys, and to avoid complication of the panel, it is not desirable to provide additional switches or keys. Selection of one of many keys for command transforming programs is awkward and apt to invite erroneous operation.

SUMMARY OF THE INVENTION

In view of the foregoing situation, it is an object of the present invention to provide a method for controlling an industrial robot wherein a command transforming program can be selected automatically.

Another object of the invention is to provide a system for controlling an industrial robot wherein a command transforming program can be selected without the provision of a selector switch or keys for designating a program.

It is a further object to provide a network for reducing the time for instructing a robot to execute a command.

The present invention resides in the generation of executable commands by transforming model commands, wherein a command transforming program is automatically selected, based upon a variable number of reference points for transformation corresponding to the kind of transformation.

In more detail, the inventive method has two instruction steps. The first step gives model commands related to positions defining the movement of the robot and model reference points spatially correlative with those positions. The order of instruction for model commands and instruction for model reference points is not, in general, a concern. More particularly, while model commands are given, characteristic points in them may be used to specify model reference points. Otherwise, model commands are given first and thereafter model reference points may be given, or vice versa. Model reference points may be located away from operational positions or may be located on the positions, provided that they have a spatial correlation.

The second instruction step gives transformed reference points which model reference points are to take following a transformation. The first and second instruction steps may employ, either commonly or separately, any of a direct teaching system, indirect teaching system, and numerical control input system.

The inventive method further includes a step of recognizing the end of the second instruction step and a subsequent step of selecting one of the command transformation programs based upon the number of transformed reference points given in the second instruction step. In a subsequent executable command generation step, model commands are transformed into executable commands by a selected command transformation program so that model reference points are translated into transformed reference points. In the subsequent drive step, the robot is operated in accordance with the executable commands generated in the previous step.

Command transformation programs to be prepared may include a congruent parallel displacement transformation program, a similar parallel displacement transformation program, a similar transformation program, and a distortion transformation program, and in this case, the congruent parallel displacement transformation program is selected when the number of transformed reference points is one, the geometrically similar parallel displacement transformation program is selected for two points, the geometrically similar transformation programs for three points, and the distortion transformation program for four points. When the number of transformed reference points is zero, model commands may be executed directly.

The foregoing sequence of steps can be performed by the following system. The system has first, second, third and fourth memories. The first memory stores command transforming programs, and the second memory stores model commands related to the operational positions of the robot. The third memory stores model reference points which correlate positionally with the operational points, and the fourth memory stores transformed reference points.

The system has a device for generating a signal indicating that all transformed reference points have been set up, and this device may be a key for generating the transformed reference points set-up completion signal (TRPSCS) provided on a control panel. The operator presses the TRPSCS key after the desired number of transferred reference points have been set up. The TRPSCS device may be arranged to determine the end of entry of transformed reference points when the transformed reference points have been entered and issuing a signal for initiating other functions.

The system has a detector which counts the number of transformed reference points which have been entered into the fourth memory after the detector is initiated in response to the output of the TRPSCS device.

The system has an executable command generator which fetches from the first memory a command transforming program corresponding to the number of transformed reference points counted by the detector, and transforms model commands read out of the second memory into executable commands so that model reference points read out from the third memory are translated to transformed reference points read out from the fourth memory.

The system has a servo controller which operates the robot in accordance with the output of the executable command generator. The servo controller may be either an open-loop system or closed-loop system, and it may be an electric servo system, hydraulic servo system, or combination thereof.

BRIEF DESCRIPTION OF THE DRAWINGS

The present invention will be more apparent from the following detailed description taken in conjunction with the accompanying drawings, in which.

DETAILED DESCRIPTION OF THE DRAWINGS

Figure 1:
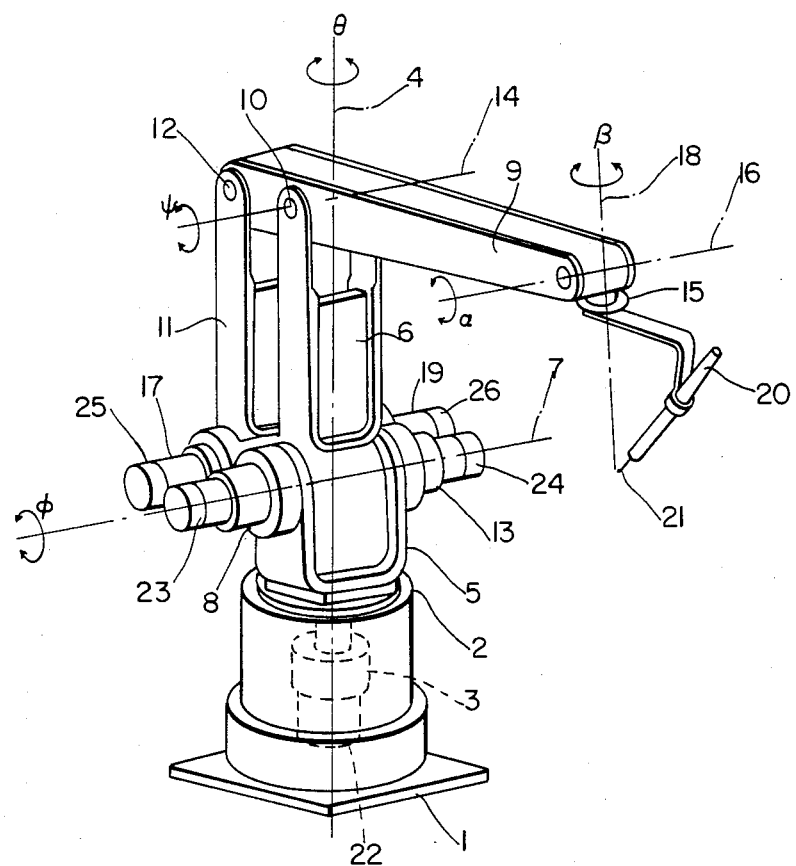
FIG. 1 is a perspective view showing the mechanism of the industrial robot suited to carry out the inventive control method.

In FIG. 1, reference number 1 denotes a base, and 2 denotes a turn-table. The turn-table 2 can be rotated by a drive means 3 provided therein through an angle $\theta$ around a vertical axis 4 as shown by the arrows. Fixed on the turn-table 2 is a U-shaped supporter 5 which supports a first arm 6 pivotally mounted for rotation through an angle $\phi$ around an axis 7. The first arm 6 is swung around axis 7 by a driver 8. A second arm 9 is pivoted by a pin 10 at the top of the first arm 6. A back lever 11 is provided in parallel to the first arm 6, with its one end pivoted by a pin 12 on the second arm 9 and another end pivoted by a pin on a lower lever (not shown) which is swung around the axis 7 by a driver 13. Thus, the first arm 6, second arm 9, back lever 11 and lower lever constitute in cooperation a parallelogramic link mechanism. Accordingly, when the driver 13 is activated, the second arm 9 is swung through an angle $\psi$ around the pin 10 on the axis 14.

In the pivotal section on the back lever 11 and lower lever, there are provided a driver 17 which swings a wrist 15 through an angle $\alpha$ around the axis 16 and another driver 19 which swings wrist 15 through an angle $\beta$ around the axis 18. A torch 20 is mounted on the wrist 15. The intersection 21 of the torch's longitudinal axis and the pivotal axis 18 represents the objective of path control. The drivers 3, 8, 13, 17 and 19 are provided with angular position encoders 22, 23, 24, 25 and 26, respectively.

The present invention, however, does not feature the robot mechanism which has been described in connection with FIG. 1 illustrating the joint type industrial robot. Therefore, the robot mechanism dealt with by the present invention is not limited to one shown in FIG. 1, but it may be any mechanism such as one of the orthogonal coordinates type, polar coordinates type, cylindrical coordinates type. It should also be appreciated that a tool mounted on the wrist 15 is not limited to a welding torch.

Figure 2:
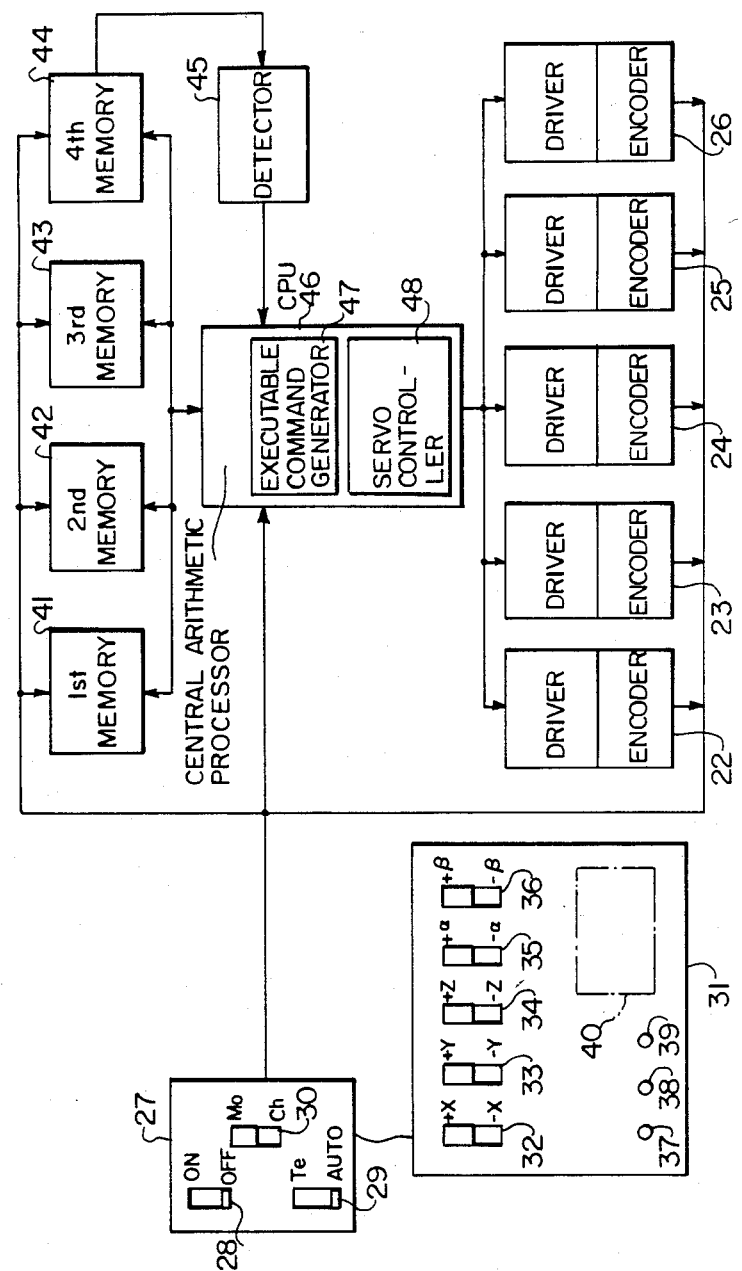
FIG. 2 is a block diagram showing an embodiment of the inventive control system.

The controller for the robot mechanism shown in FIG. 1 will now be described with reference to FIG. 2. The arrangement includes a control panel 27, on which are provided a power switch 28 through which electric power is supplied to the entire robot system, a mode selector switch 29 for selecting the teaching mode or automatic operation mode, and a mode selector switch 30 for selecting the model command mode or transformed command mode.

The control panel 27 is connected with a teaching box 31, on which are provided axis selector switches 32, 33 and 34 for moving the path control objective 21 in the $+X/-X$, $+Y/-Y$ and $+Z/-Z$ directions, respectively, on the three-dimensional coordinate, and axis selector switches 35 and 36 for turning the wrist 15 in the $+\alpha/-\alpha$ and $+\beta/-\beta$ directions by the activation of the drivers 17 and 19, respectively. The teaching box 31 is further provided with write keys 37 and 38, a transformed reference point setup completion (TRPSC) key 39, and a group of function write keys 40. The circuit arrangement is made such that when the write key 37 is pressed with the selector switch 29 being set to teaching mode (Te) and the selector switch 30 set to model command mode (Mo), the output signals of the encoders 22 through 26 are stored as an original teaching point in the second memory 42. Similarly, when the write key 37 is pressed with the selector switch 29 being set to teaching mode (Te) and the selector switch 30 set to transformed command mode (Ch), the output signals of the encoders 22-26 are stored as a transformed reference point in the fourth memory 44. When the write key 38 is pressed with the selector switch 29 set to Te and the selector switch 30 set to Mo, the output signals of the encoders 22 through 26 are stored as a model reference point in the third memory 43.

A model reference point and a transformed reference point stored consecutively in the third memory 43 and fourth memory 44, respectively, correspond to each other; e.g., the model reference point stored in the third memory 43 at the third time corresponds to the transformed reference point stored in the fourth memory 44 at the third time.

The TRPSC key 39 functions as the transformed reference point setup completion signal (TRPSCS) generator, and it is pressed after the desired number of transformed reference points have been set. When the TRPSC key 39 is pressed, the number of transformed reference points stored in the fourth memory 44 is counted by the detection means 45. The function write keys 40 are used to program operational functions of the robot, and input data is stored in the second memory 42 together with the original teaching point when the write key 37 is pressed so that a sequence of model commands is formed. The first memory 41 stores a plurality of command transforming programs.

Reference number 46 denotes a central arithmetic processor incorporating an executable command generator 47 and a servo controller 48. On receiving a signal from the detector 45 indicative of the number of transformed reference points, the executable command generator 47 fetches a command transforming program corresponding to the number of transformed reference points from the first memory 41, and transforms a model command read out of the second memory 42 into an executable command so that the model reference point read out from the third memory is translated to the transformed reference point read out from the fourth memory. The executable command is subjected to coordinate transformation. In the central arithmetic processor 46 and fed to the servo controller 48 as positioning command signals for indicating an operational target for the drive means 3, 8, 13, 17 and 19. The servo controller 48 receives the execution command from the executable command generator 47 and activates the drivers 3, 8, 13, 17 and 19 accordingly.

Figure 3:
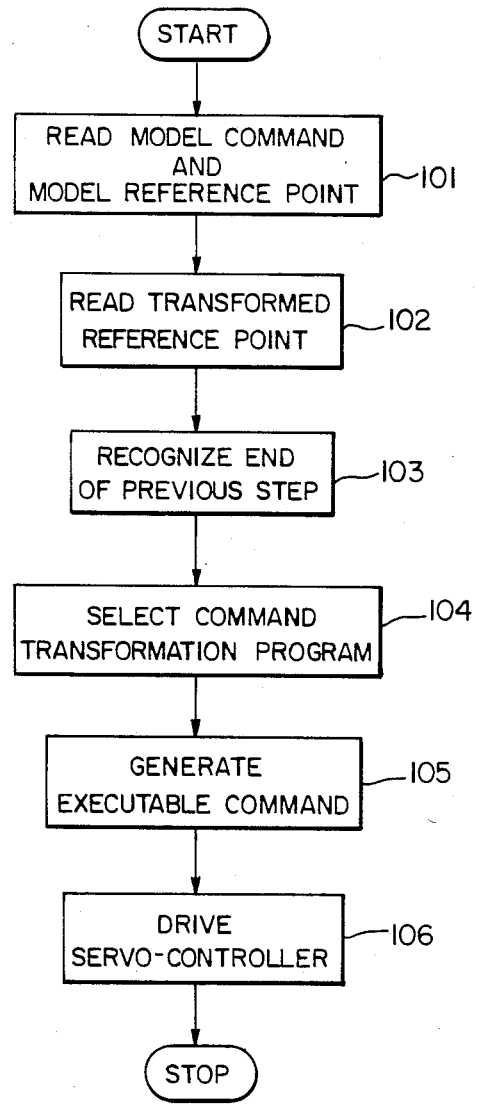
FIG. 3 is a flowchart showing an embodiment of the inventive control method.
Figure 4:
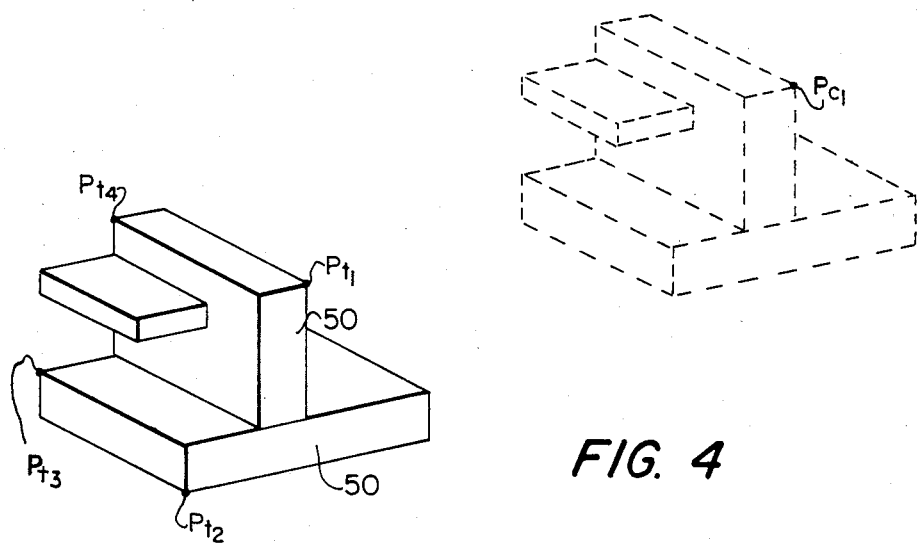
FIG. 4 is a perspective diagram showing, as an example, the operation under the congruent parallel displacement transformation program.

In the foregoing arrangement, it is assumed that the second memory 42 stores model commands which cause the positioning objective 21 to trace the ridges of a workpiece 50 shown in FIG. 4 in a predetermined sequence, and the first memory 41 stores the congruent parallel displacement transformation program, similar parallel displacement transformation program, similar transformation program, and distortion transformation program. Among the four command transformation programs, the distortion transformation program needs the largest number of transformed reference points to be instructed, and four model reference points, i.e., $Pt_1(Xt_1,Yt_1,Zt_1)$, $Pt_2(Xt_2, Yt_2, Zt_2)$, $Pt_3(Xt_3,Yt_3,Zt_3)$, and $Pt_4(Xt_4, Yt_4, Zt_4)$ are given in the first instruction step 101 shown in FIG. 3. At this time, the model commands stored in the second memory 42 are also instructed.

In the second instruction step 102, the necessary number of transformed reference points are entered into the fourth memory 44 by way of indirect teaching. When the key 39 is pressed on completion of data entry, the recognition step 103 is carried out. After the recognition step, when the detector 45 has determined in selection step 104 that the number of transformed reference points is one, i.e., $Pc_1$ as shown in FIG. 4, executable command generator 47 fetches the congruent parallel displacement transformation program from the first memory 41. The executable command generator 47 produces the executable command $(x',y',z')$ from the coordinates $(Xc_1,Yc_1,Zc_1)$ of the transformed reference point $Pc_1$ read out from the fourth memory and the model command $(x,y,z)$ in accordance with Equation (1).

$$\begin{vmatrix} x' \\ y' \\ z' \end{vmatrix} = \begin{vmatrix} 1 & 0 & 0 \\ 0 & 1 & 0 \\ 0 & 0 & 1 \end{vmatrix} \begin{vmatrix} x \\ y \\ z \end{vmatrix} + \begin{vmatrix} Xc_1 - Xt_1 \\ Yc_1 - Yt_1 \\ Zc_1 - Zt_1 \end{vmatrix} \quad (1)$$

This is the executable command generation step shown by reference number 105.

Figure 5:
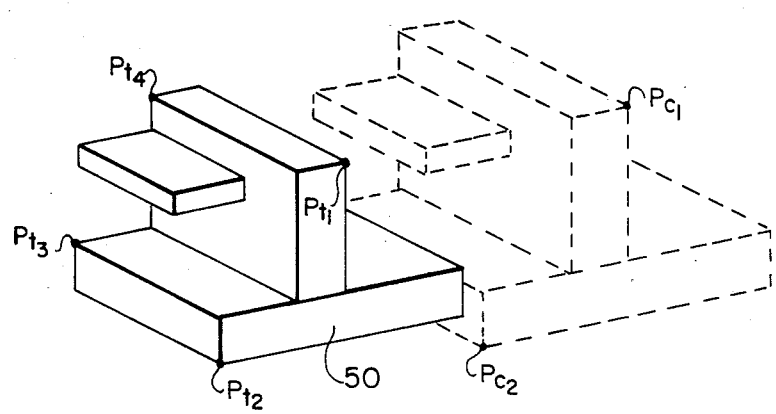
FIG. 5 is a perspective diagram showing, as an example, the operation under the similar parallel displacement transformation program.

In another case, if the detector 45 has determined the number of transformed reference points stored in the fourth memory 44 to be two, i.e., $Pc_1$ and $Pc_2$ as shown in FIG. 5, the executable command generator 47 fetches the similar parallel displacement transformation program from the first memory 41. Then, the circuit 47 produces the executable command $(x',y',z')$ using coordinates $(Xc_1,Yc_1,Zc_1)$ and $(Xc_2,Yc_2,Zc_2)$ of the transformed reference points $Pc_1$ and $Pc_2$, respectively, read out from the fourth memory 44 in accordance with Equation (2).

$$\begin{vmatrix} x' \\ y' \\ z' \end{vmatrix} = \begin{vmatrix} n & 0 & 0 \\ 0 & n & 0 \\ 0 & 0 & n \end{vmatrix} \begin{vmatrix} x \\ y \\ z \end{vmatrix} + \begin{vmatrix} Xc_1 - Xt_1 \\ Yc_1 - Yt_1 \\ Zc_1 - Zt_1 \end{vmatrix} \quad (2)$$

where $n = \dfrac{\overline{Pc_1 \cdot Pc_2}}{\overline{Pt_1 \cdot Pt_2}}$

Figure 6:
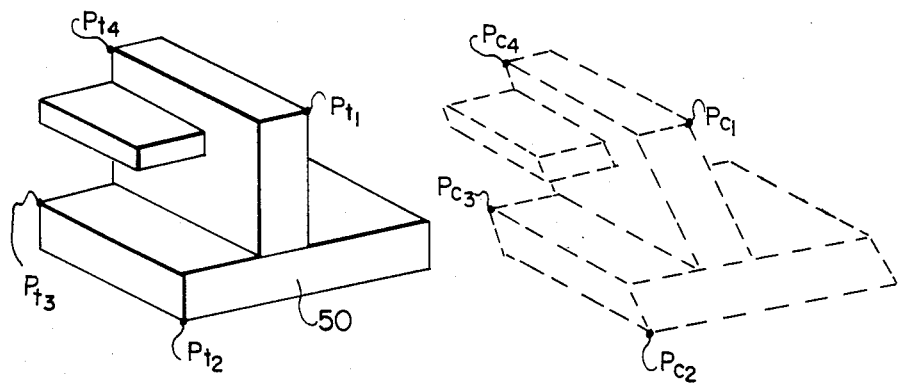
FIGS. 6, 7 and 8 are perspective diagrams showing, as an example, the operations under the distortion transformation program.

If the detector 45 has determined the number of transformed reference points stored in the fourth memory 44 to be four, i.e., $Pc_1$ through $Pc_4$ as shown in FIG. 6, the executable command generator 47 fetches the distortion transformation program from the first memory 41. Then, the circuit 47 produces the executable command $(x',y',z')$ using coordinates $(Xc_1,Yc_1,Zc_1)$, . . . $(Xc_4,Yc_4,Zc_4)$ of the transformed reference points $Pc_1$ through $Pc_4$ read out from the fourth memory 44 in accordance with Equation (3).

$$\begin{vmatrix} x' \\ y' \\ z' \end{vmatrix} = \begin{vmatrix} a_1 & a_2 & a_3 \\ a_4 & a_5 & a_6 \\ a_7 & a_8 & a_9 \end{vmatrix} \begin{vmatrix} x - Xt_1 \\ y - Yt_1 \\ z - Zt_1 \end{vmatrix} + \begin{vmatrix} Xc_1 \\ Yc_1 \\ Zc_1 \end{vmatrix} \quad (3)$$

where $$\begin{vmatrix} a_1 & a_2 & a_3 \\ a_4 & a_5 & a_6 \\ a_7 & a_8 & a_9 \end{vmatrix} = \begin{vmatrix} Xc_2 - Xc_1, & Xc_3 - Xc_1, & Xc_4 - Xc_1 \\ Yc_3 - Yc_1, & Yc_3 - Yc_1, & Yc_4 - Yc_1 \\ Zc_2 - Zc_1, & Zc_3 - Zc_1, & Zc_4 - Zc_1 \end{vmatrix} \times$$

$$\begin{vmatrix} Xt_2 - Xt_1, & Xt_3 - Xt_1, & Xt_4 - Xt_1 \\ Yt_2 - Yt_1, & Yt_3 - Yt_1, & Yt_4 - Yt_1 \\ Zt_2 - Zt_1, & Zt_3 - Zt_1, & Zt_4 - Zt_1 \end{vmatrix}^{-1} \quad (4)$$

Figure 7:
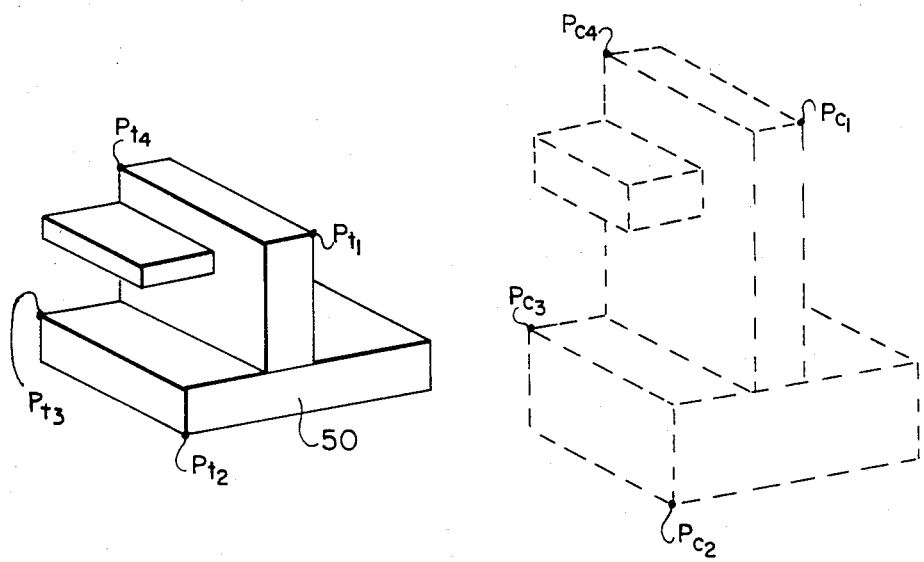
Figure 8:
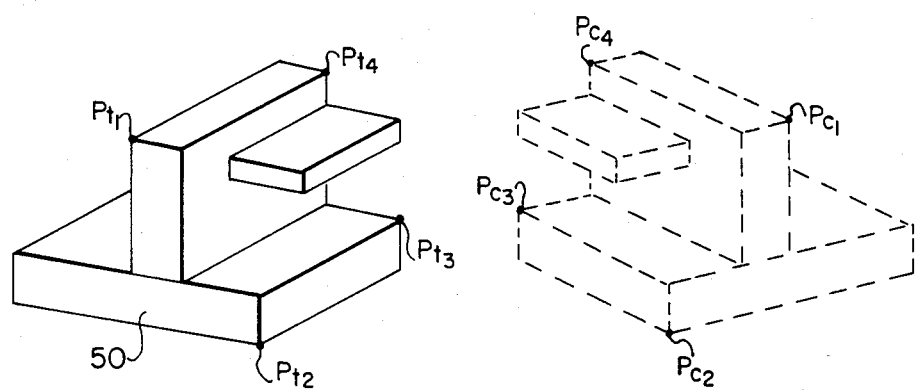

In case there are four transformed reference points, other transformations such as that shown in FIG. 7 where a dimension is expanded along only one coordinate axis, or mirror transformation as shown in FIG. 8, (these are different versions of distortion transformation), are possible.

Figure 9:
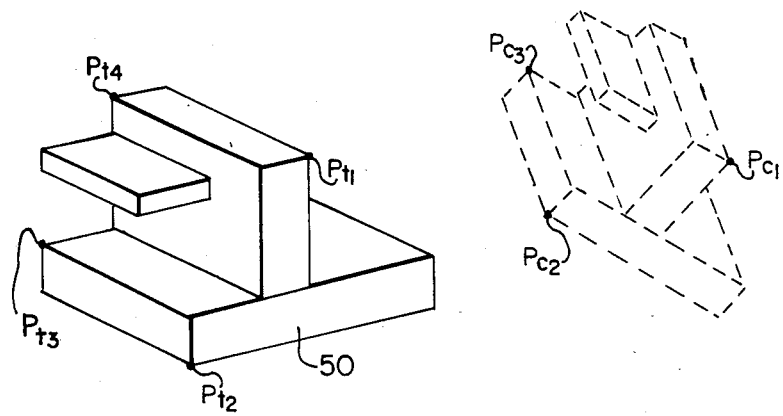
FIG. 9 is a perspective diagram showing, as an example, the operation under the similar transformation program.

If the detector 45 has determined the number of transformed reference points stored in the fourth memory 44 to be three, i.e., $Pc_1$, $Pc_2$ and $c_3$ as shown in FIG. 9, executable command generator 47 fetches the similar transformation program from first memory 41, and then produces the executable command using coordinates $(Xc_1, Yc_1, Zc_1)$, $(Xc_2, Yc_2, Zc_2)$ and $(Xc_3, Yc_3, Zc_3)$ of the transformed reference points $Pc_1$, $Pc_2$ and $Pc_3$, respectively read out from the fourth memory 44 in accordance with the above Equations (3) and (4). In this case, the additional coordinates $(Xc_4, Yc_4, Zc_4)$ are evaluated using Equations (5) and (6) and the values are substituted into Equations (3) and (4).

$$\begin{vmatrix} Wc_1 \\ Wc_2 \\ Wc_2 \end{vmatrix} = \begin{vmatrix} Xc_2 - Xc_1 \\ Yc_2 - Yc_1 \\ Zc_2 - Zc_1 \end{vmatrix} \times \begin{vmatrix} Xc_3 - Xc_1 \\ Yc_3 - Yc_1 \\ Zc_3 - Zc_1 \end{vmatrix} \quad (5)$$

$$\begin{vmatrix} Xc_4 \\ Yc_4 \\ Zc_4 \end{vmatrix} = \begin{vmatrix} Wc_1 & Xc_1 \\ Wc_2 + Yc_1 \\ Wc_3 & Zc_1 \end{vmatrix} \quad (6)$$

The values of the model command $(x,y,z)$ in general, are to be transformed from time-to-time. An executable command $(x',y',z')$ corresponding to a model command is calculated by the executable command generator 47 as mentioned above. The resultant values are further subjected to coordinate transformation by central arithmetic processor 46, and the positioning command signals for indicating an operational target for drivers 3, 8, 13, 17 and 19 are produced. Formation of these command signals is disclosed in detail in U.S. Pat. No. 4,348,731 and also in Japanese Patent Application No. 57-135172.

The servo controller 48 operates to compare the outputs of the encoders 22 through 26 with the corresponding command signals and provides the differential outputs to drivers 3, 8, 13, 17 and 19, which then operate accordingly in the drive step 106.

The present invention is not limited to the illustrated embodiment, but various modifications are possible. For example, in instructing the original teaching point, model reference points, transformed reference points, etc. by way of indirect teaching, command signals issued by central arithmetic processor 46 may be memorized instead of storing the encoder output signals in the second, third and fourth memories.

Although, in the foregoing embodiment, key 39 is provided for producing a signal indicative of the end of entry of the necessary number of transformed reference points, an alternative signal for controlling the end of entry of transformed reference points may be produced in response to the operation of one of function write keys 40 unrelated directly to the entry of transformed reference points or selector switch 29 turned to the automatic operation (AUTO) mode, and in this case key 39 can be eliminated.

I claim:

1. A method of controlling a robot, comprising the steps of:
    reading a model command for controlling movement of an objective of a robot, model reference points spatially correlative with positions defining operational positions of the objective and at least one transformed reference point which corresponding ones of said model reference points will have after translation of said model reference point by one of a plurality of command transformation programs for transforming said model command into an executable command;
    providing an indication of the completion of said reading step;
    determining the number of said transformed reference points;
    selecting, in response to said indication, one of said plurality of said command transformation programs corresponding to said number of transformed reference points;
    transforming said model command into an executable command using the one of said command transformation programs selected to provide for translation of said model reference point to said transformed reference point; and
    operating the robot in response of said executable command.

2. The method of claim 1, further comprised of reading said model reference points after completion of the reading of said model command.

3. The method of claim 1, further comprised of reading said model reference points while simultaneously reading said model command.

4. The method of claim 1, further comprised of reading said model command after all of said model reference points have been read.

5. The method of claim 1, wherein said selected one of said plurality of programs transforms said model command into an executable command capable of effecting:
    a change in the positions of said objective from said model reference points to said transformed reference point if said number of transformed reference points is one;
    a change in the position of said objective from said model reference points to said transformed reference points and a change in the span of linear movement of said objective along any of three orthogonal coordinates if said number of transformed reference points is two;
    a change in the position of said objective from said model reference points to said transformed reference points, a change in the span of linear movement of said objective along any of three orthogonal coordinates, and a change in the angular orientation of an axis passing through said objective relative to one of said coordinates if said number of transformed reference points is three; and
    a change in the position of said objective from said model reference points to said transformed reference points, a change in the span of linear movement of said objective along any of three orthogonal coordinates, and a change in the angular orientation of said axis relative to said coordinates if said number of transformed reference points is four.

6. A system for controlling a robot, comprising:
    memory means for storing a plurality of command transformation programs, model commands for controlling movement of an objective of a robot, model reference points defining an initial position of the objective, and at least one transformed reference point defining a subsequent position of the objective after movement of said objective from said initial position;
    means for indicating the end of storing said transformed reference points in said memory means;
    detection means operatively responsive to said indicating means for counting the number of said transformed reference points stored in said memory means;
    processing means including executable command generating means for reading from said memory means one of said command transforming programs selected to correspond to the number of transformed reference points counted by said detection means, and transforming said model commands into executable commands using said selected command transforming program to provide for translation of said objective from said model reference points to said transformed reference points, for providing a position command signal from said executable command; and
    means for driving the robot in response to said position command.

7. The robot control system according to claim 6, wherein:
    said driving means includes means for providing an encoder output indicative of changes in the position of said robot imparted by said driving means; and
    said processing means includes control means for comparing said position command signal with said encoder output and for applying a differential signal to said driving means in response to the occurrence of differences between said position command signal and encoder output.

8. The robot control system according to claim 6, wherein said indicating means comprises a key operated to provide a completion signal to said processing means when storage of said transformed reference points in said memory means is completed.

9. The robot control system according to claim 6, wherein said indicating means is arranged to indicate the completion of entry of said transformed reference points into said memory means.

10. The method of claim 2, wherein said selected one of said plurality of programs transforms said model command into an executable command capable of effecting:
   a change in the model command to cause a geometrically congruent and parallel displacement of said objective from said model reference points to said transformed reference point if said number of transformed reference points is one;
   a change in the model command to cause a geometrically similar and parallel displacement of said objective from said model reference points to said transformed reference point if said number of transformed reference points is two;
   a change in the model command to cause a geometrically similar and free displacement of said objective from said model reference points to said transformed reference point if said number of transformed reference points is three; and
   a change in the model command to cause geometrical distortion and free displacement of said objective from said model reference points to said transformed reference point if said number of transformed reference points is four.

11. The method of claim 2, further comprising:
   operating the robot to perform said model command to position the objective of the robot to a position defined by said model reference points when said number is zero.

12. The method of claim 1, wherein a command transformation program corresponding to a number greater in value than said number of transformed reference points is used during said transformation step in lieu of one of said command transformation programs corresponding to said number of transformed reference points.

13. The method of claim 1, wherein said reference points are read during said reading step by storing output signals from an encoder which shows the position of the objective of the robot when said signals indicate the occurrence of intersections of a plurality of surfaces of a model workpiece, and said transformed reference point is used by storing output signals from said encoder which indicate the occurrence of an intersection of a plurality of surfaces of a different workpiece.

14. A system for controlling a robot, comprising:
   a control panel having a first mode selector switch for selecting one of a teaching mode and an operational mode, and a second mode selector switch for selecting one of a model command mode and transformed command mode;
   a teaching box connected with said control panel, having a plurality of axis selector switches for moving the path control objective of a robot relative to a plurality of axes, a write key and a transformed reference point setup completion key;
   memory means for storing a plurality of command transformation programs, model commands for controlling movement of an objective of a robot, model reference points defining an initial position of the objective, and at least one transformed reference point defining a subsequent position of the objective after movement of said objective from said initial position;
   a detector connected with said memories and operatively responsive to said transformed reference point set up completion key for counting the number of said transformed reference points stored in said fourth memory;
   a central arithmetic processor connected with said control panel, said memory means and said detector, including an executable command generator and a servo-controller, said executable command generator reading from said memory means one of said command transforming programs selected to correspond to the number of transformed points counted by said detector and transforming said model commands into executable commands using said selected command transforming program to provide for translation of said objective from said model reference points to said transformed reference points and converting said executable command into a positioning command signal, said servo-controller receiving said positioning command signal to be compared with position feedback signals, said position feedback signals indicating the location of said objective;
   a plurality of encoders generating said position feedback signals, and providing said position feedback signals to said servo-controller, whereby said servo-controller compares said position feedback signals of said encoders with the positioning command signal and generates differential outputs; and
   a plurality of drivers connected with said central arithmetic processor and driving the robot in response to said differential outputs respectively received from said servo-controller and said executable command generator.

* * * * *